(12) United States Patent
Isono et al.

(10) Patent No.: US 8,974,963 B2
(45) Date of Patent: Mar. 10, 2015

(54) LITHIUM SECONDARY BATTERY

(75) Inventors: Motoshi Isono, Toyota (JP); Shigeto Okada, Fukuoka (JP); Jun-ichi Yamaki, Fukuoka (JP)

(73) Assignees: Toyota Jidosha Kabushiki Kaisha, Toyota-shi, Aichi-ken (JP); Kyushu University, National University Corporation, Fukuoka (JP)

( * ) Notice: Subject to any disclaimer, the term of this patent is extended or adjusted under 35 U.S.C. 154(b) by 92 days.

(21) Appl. No.: 13/499,336

(22) PCT Filed: Sep. 30, 2010

(86) PCT No.: PCT/IB2010/002481
§ 371 (c)(1),
(2), (4) Date: Mar. 30, 2012

(87) PCT Pub. No.: WO2011/039619
PCT Pub. Date: Apr. 7, 2011

(65) Prior Publication Data
US 2012/0183857 A1  Jul. 19, 2012

(30) Foreign Application Priority Data
Oct. 2, 2009  (JP) ................................ 2009-230909

(51) Int. Cl.
*H01M 4/131* (2010.01)
*H01M 4/505* (2010.01)
(Continued)

(52) U.S. Cl.
CPC ................ *H01M 4/505* (2013.01); *C03C 3/16* (2013.01); *C03C 3/19* (2013.01); *C03C 4/14* (2013.01); *H01M 4/525* (2013.01); *H01M 10/052* (2013.01); *H01M 4/131* (2013.01);
(Continued)

(58) Field of Classification Search
USPC ........................ 429/223, 231.1, 231.95, 218.1
See application file for complete search history.

(56) References Cited

U.S. PATENT DOCUMENTS 5,993,998 A * 11/1999 Yasuda .................... 429/231.95
6,461,770 B1  10/2002 Yoshimura et al.
(Continued)

FOREIGN PATENT DOCUMENTS

EP  1 049 182 A  11/2000
JP  11-25983  1/1999
(Continued)

OTHER PUBLICATIONS

International Search Report in International Application No. PCT/IB2010/002481; Mailing Date: Feb. 22, 2011.
(Continued)

*Primary Examiner* — Stewart Fraser
*Assistant Examiner* — Olatunji Godo
(74) *Attorney, Agent, or Firm* — Finnegan, Henderson, Farabow, Garrett & Dunner, LLP

(57) ABSTRACT

A lithium secondary battery includes: a positive electrode that contains a positive electrode active material; a negative electrode; and a nonaqueous electrolyte. The positive electrode active material is amorphous and is expressed by $Li_xA[P_aM_{1-a}]_yO_z$ where, in the formula, A is Mn or Ni; M is a glass former element having an electronegativity lower than P; and x, y, a and z respectively satisfy $1<x\leq2.5$, $0<y\leq3$, $0\leq a<1$ and $z=(x+(\text{valence of A})+(\text{valence of P})\times a\times y+(\text{valence of M})\times(1-a)\times y)/2$.

4 Claims, 7 Drawing Sheets

(51) Int. Cl.
*C03C 3/16* (2006.01)
*C03C 3/19* (2006.01)
*C03C 4/14* (2006.01)
*H01M 4/525* (2010.01)
*H01M 10/052* (2010.01)
*H01M 4/58* (2010.01)
*H01M 10/0566* (2010.01)

(52) U.S. Cl.
CPC ........ *H01M 4/5825* (2013.01); *H01M 10/0566* (2013.01); *Y02E 60/122* (2013.01); *Y02T 10/7011* (2013.01)
USPC ................ 429/223; 429/218.1; 429/231.1; 429/231.95

(56) References Cited

U.S. PATENT DOCUMENTS

| | | | |
|---|---|---|---|
| 6,605,386 B1 * | 8/2003 | Kasamatsu et al. | 429/218.1 |
| 2006/0246351 A1 | 11/2006 | Barker et al. | |
| 2008/0131356 A1 * | 6/2008 | Kumar et al. | 423/598 |
| 2010/0015525 A1 | 1/2010 | Isono | |

FOREIGN PATENT DOCUMENTS

| | | |
|---|---|---|
| JP | 2008-204702 | 9/2008 |
| JP | 2008-251481 | 10/2008 |
| WO | WO 2008/120106 A | 10/2008 |

OTHER PUBLICATIONS

Written Opinion of the International Searching Authority in International Application No. PCT/IB2010/002481; Mailing Date: Feb. 22, 2011.

M. Isono et al., "Synthesis and Electrochemical Characterization of Amorphous Li—Fe—P—B—O Cathode Materials for Lithium Batteries," Journal of Power Sources, vol. 195, pp. 593-598 (2010).

F. Zhou et al., "The Li Intercalation Potential of $LiMPO_4$ and $LiMSiO_4$ Olivines with M=Fe, Mn, Co, Ni," Electrochemistry Communications, vol. 6, pp. 1144-1148 (2004).

Applicant's Response to Written Opinion in International Application No. PCT/IB2010/002481 (Aug. 2, 2011).

Applicant's Response to Written Opinion in International Application No. PCT/IB2010/002481 (Nov. 17, 2011).

* cited by examiner

LITHIUM SECONDARY BATTERY

CROSS-REFERENCE TO RELATED APPLICATIONS

This application is a national phase application of International Application No. PCT/IB2010/002481, filed Sep. 30, 2010, and claims the priority of Japanese Application No. 2009-230909, filed Oct. 2, 2009, the contents of both of which are incorporated herein by reference.

BACKGROUND OF THE INVENTION

1. Field of the Invention

The invention relates to a lithium secondary battery. More specifically, the invention relates to a lithium secondary battery that includes a positive electrode having an amorphous positive electrode active material, a negative electrode and a nonaqueous electrolyte. In addition, the invention relates to a use of the lithium secondary battery.

2. Description of the Related Art

A lithium secondary battery (typically, a lithium ion battery) is charged or discharged in such a manner that lithium ions migrate between a positive electrode and a negative electrode. The lithium secondary battery has a light weight and a high power, so a demand for the lithium secondary battery is expected to increasingly grow as a vehicle-mounted power supply, a power supply for a personal computer and a power supply for a mobile terminal in the future. Japanese Patent Application Publication No. 2008-251481 (JP-A-2008-251481) describes a lithium secondary battery.

One typical configuration of a lithium secondary battery of this type includes an electrode in which a material (electrode active material) that is able to reversibly occlude and release lithium ions is held by a conductive member (electrode current collector). A typical example of an electrode active material (positive electrode active material) used for a positive electrode is a lithium transition metal composite oxide, such as a lithium-nickel-based oxide and a lithium-cobalt-based oxide. Another example of the positive electrode active material is a so-called olivine-type phosphate compound containing lithium (for example, $LiMnPO_4$, $LiNiPO_4$, and the like). The olivine-type phosphate compound has a high theoretical capacity, reduces cost and has a high degree of safety, so the olivine-type phosphate compound receives attention as a promising positive electrode active material. The olivine-type phosphate compound of this type is described in Japanese Patent Application Publication No. 11-025983 (JP-A-11-025983).

Incidentally, a battery is generally used (charged or discharged) within the range of potential that takes into consideration the decomposition potential of a nonaqueous electrolyte. However, the olivine-type phosphate compound, such as $LiMnPO_4$, has a redox potential higher than that of a lithium transition metal composite oxide, such as a lithium-nickel-based oxide and a lithium-cobalt-based oxide. Therefore, in a battery configuration that uses a general electrolyte in which a carbonate-based solvent, or the like, is used as a nonaqueous solvent, decomposition of the electrolyte occurs if the potential of the positive electrode is excessively increased, so there is a problem that the intrinsic capacity of the olivine-type phosphate compound cannot be sufficiently utilized (when trying to use a battery within a range in which the potential of the positive electrode does not excessively fall above the decomposition potential of the electrolyte, a high capacity cannot be obtained) or the flexibility of selection of the composition of the electrolyte is low (the number of choices of a nonaqueous solvent is small, that is, the nonaqueous solvent is limited to the one having a relatively high decomposition potential).

SUMMARY OF INVENTION

The invention provides a lithium secondary battery that has a high capacity and excellent charge and discharge characteristics.

The inventors diligently studied and found that the redox potential may be decreased in such a manner that the structure of an olivine-type phosphate compound, such as $LiMnPO_4$, is amorphized and part of or all of P are replaced by a glass former element having an electronegativity lower than that of P, and completed the invention.

That is, a first aspect of the invention relates to a lithium secondary battery that includes a positive electrode that contains a positive electrode active material; a negative electrode and a nonaqueous electrolyte. The positive electrode active material is amorphous and is expressed by the following composition formula:

$$Li_xA[P_aM_{1-a}]_yO_z \qquad (I)$$

where, in the formula, A is Mn or Ni; M is a glass former element having an electronegativity lower than P; and x, y, a and z respectively satisfy $1<x\le 2.5$, $0<y\le 3$, $0\le a<1$ and $z=(x+$ (valence of A)+(valence of P)×a×y+(valence of M)×(1−a)× y)/2.

With the above aspect, in the amorphous positive electrode active material expressed by the composition formula $Li_xA[P_aM_{1-a}]_yO_z$, part of or all of P are replaced by the element M having an electronegativity lower than that of P. Therefore, in comparison with a case without replacement, the redox potential may be decreased. By so doing, reaction of lithium occurs at a further low potential, so larger amounts of lithium in the positive electrode active material may be extracted while the potential of the positive electrode is increased in a range in which decomposition of the electrolyte does not excessively occur. Thus, it is possible to increase the amount of lithium usable in charging and discharging, and it is possible to obtain a positive electrode active material suitable for a high-capacity battery.

M in the composition formula (I) may be an element that has an electronegativity lower than that of P (phosphorus) and that can form a vitreous material (amorphous structure), and is not specifically limited. For example, in addition to B (boron), Si (silicon) and Sn (tin), a hetero element that has an electronegativity lower than that of P and that can form an oxyacid (typically, an element that can become an essential element X of an oxyacid expressed by XOn) may be employed as the glass former element M. A specific example of the hetero element may be an element, such as Ta (tantalum), Ti (titanium), Nb (niobium), Al (aluminum), V (vanadium), Cr (chromium), Ge (germanium), Mo (molybdenum) and As (arsenic). Among others, at least one of B, Si and Sn is desirably used, and, particularly, B is desirably used. One or two or more of elements may be selected from among the above element group. In a desirable aspect of the invention, 70 percent (on an atomicity basis) or more of M are formed of one or two or more of elements selected from the group consisting of B, Si and Sn. The substantially whole of M may be formed of one or two or more of elements selected from the group consisting of B, Si and Sn. For example, M may be substantially formed of only B.

A in the composition formula (I) may be Mn, and, where the decomposition potential of the electrolyte is Ve, the average electronegativity of the $[P_aM_{1-a}]$ may be lower than (Ve+

5.08)/4.15. When the average electronegativity of the $[P_aM_{1-a}]$ falls within the above range, the redox potential may be reduced to a potential at which decomposition of the electrolyte does not occur.

A in the composition formula (I) may be Ni, and, where the decomposition potential of the electrolyte is Ve, the average electronegativity of the $[P_aM_{1-a}]$ may be lower than (Ve+ 4.36)/4.00. When the average electronegativity of the $[P_aM_{1-a}]$ falls within the above range, the redox potential may be reduced to a potential at which decomposition of the electrolyte does not occur.

A in the composition formula (I) may mainly contain an Ni amorphous phase and may contain a crystal phase of at least one of Ni, NiO and $Ni_2P$. Because the positive electrode active material mixedly contains the crystal phase, the electron conductivity improves, so a further high capacity may be obtained.

The lithium secondary battery may be equipped for a vehicle, such as an automobile. Thus, with the aspect of the invention, it is possible to provide a vehicle equipped with the lithium secondary battery (which can be a battery pack in which a plurality of lithium secondary batteries are connected) described here. Particularly, because the lithium secondary battery can give high power in light weight, a vehicle (for example, automobile) equipped with the lithium secondary battery as a power source (typically, a power source of a hybrid vehicle or an electric vehicle) is provided.

BRIEF DESCRIPTION OF DRAWINGS

The features, advantages, and technical and industrial significance of this invention will be described below with reference to the accompanying drawings, in which like numerals denote like, elements, and wherein.

DETAILED DESCRIPTION OF EMBODIMENTS

Figure 1:
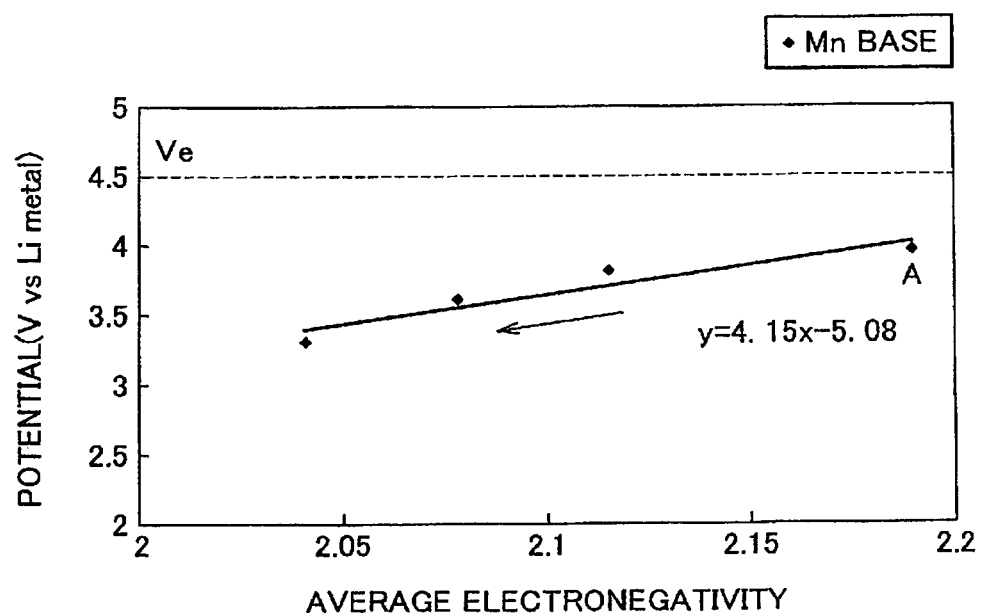
FIG. 1 is a graph (Mn base) that shows the relationship between the average electronegativity of $[P_aM_{1-a}]$ and the redox potential.

In the drawings, like reference numerals denote components and portions that have similar functions. Note that the dimensions (length, width, thickness, and the like) in each drawing do not reflect actual dimensions. In addition, a matter other than the matter specifically referred to in the specification and necessary for carrying out the aspect of the invention (for example, the configuration and manufacturing method of an electrode assembly that includes a positive electrode and a negative electrode, the configurations and manufacturing methods of a separator and an electrolyte, and a general technique related to construction of a lithium secondary battery and other batteries, and the like) may be held as a design matter of a person skilled in the art based on an existing art in the technical field.

First, a positive electrode active material will be described. The positive electrode active material according to the present embodiment is formed so that the structure of an olivine-type phosphate compound, such as $LiMnPO_4$, is amorphized and then part of or all of P are replaced by a glass former element having an electronegativity lower than that of P. That is, the positive electrode active material is amorphous and is expressed by the following composition formula.

$$Li_xA[P_aM_{1-a}]_yO_z \qquad (I)$$

In the above composition formula (I), A is Mn or Ni. In addition, M is a glass former element (element that can form a vitreous material) having an electronegativity lower than that of P (phosphorus). In addition, the values of x, y and a respectively satisfy $1<x\leq2.5$, $0<y\leq3$ and $0\leq a<1$, and the value of z is expressed by $z=(x+(\text{valence of A})+(\text{valence of P})\times a\times y+(\text{valence of M})\times(1-a)\times y)/2$ so as to satisfy stoichiometry (electroneutrality).

With the positive electrode active material according to the present embodiment, in the amorphous positive electrode active material expressed by the composition formula $Li_xA[P_aM_{1-a}]_yO_z$, part of or all of P are replaced by the element M having an electronegativity lower than that of P. Therefore, in comparison with a case without replacement, the redox potential may be decreased, and a further high capacity may be obtained. Furthermore, the positive electrode active material will be described with reference to FIG. 1.

FIG. 1 is a graph that shows the relationship between the average electronegativity of $[P_aM_{1-a}]$ and the redox potential in the amorphous positive electrode active material in which A in the above composition formula (I) is Mn. As shown in FIG. 1, when the X axis represents the average electronegativity of $[P_aM_{1-a}]$ and the Y axis represents the potential V (vs. Li metal), the average electronegativity of $[P_aM_{1-a}]$ and the redox potential are approximately proportional to each other, and the redox potential decreases as the average electronegativity of $[P_aM_{1-a}]$ decreases. Specifically, the relationship between the average electronegativity of $[P_aM_{1-a}]$ and the redox potential is expressed by Y=4.15X−5.08.

Here, in a non-replaced positive electrode active material (indicated by A in FIG. 1) in which P is not replaced by M, the redox potential is excessively high (a difference from the redox potential to Ve is small) with respect to the decomposition potential Ve of an electrolyte (here, the electrolyte having a decomposition potential Ve of 4.5 V, and, hereinafter, also referred to as electrolyte E1), so the amount of lithium extracted until the potential of the positive electrode reaches the decomposition potential Ve of the electrolyte E1 is small. Therefore, there is a problem that, when trying to use a battery in a range that takes into consideration the decomposition potential Ve of the electrolyte E1 (typically, a range in which the potential of the positive electrode does not excessively fall above Ve), the theoretical capacity of the non-replaced positive electrode active material cannot be sufficiently utilized and then a high capacity cannot be obtained. In contrast, in the present embodiment, part of P are replaced by M to decrease the value of the average electronegativity of $[P_aM_{1-a}]$. By so doing, in comparison with the case of the non-replaced A, the redox potential may be decreased. With the above configuration, insertion and extraction of lithium occur at a further low potential, so a further large amount of lithium in the positive electrode active material may be extracted while the potential of the positive electrode is increased in the range in which decomposition of the electrolyte E1 does not excessively occur. By so doing, it is possible to increase the amount of lithium usable in charging and discharging, and it is possible to obtain a further high-capacity positive electrode active material.

The average electronegativity of $[P_aM_{1-a}]$ may be appropriately regulated in consideration of the decomposition potential Ve of the electrolyte. In view of increasing the capacity, the redox potential (oxidation potential) is desirably lower at least by about 0.1 V (for example, about 0.1 V to 0.5 V) than the decomposition potential Ve of the electrolyte with respect to lithium, and the value of the average electronegativity of $[P_aM_{1-a}]$ may be determined so as to fall within the desirable range. The average electronegativity of $[P_aM_{1-a}]$ may be regulated to fall within the described desirable range by appropriately selecting the type of M and a replacement ratio (value of a).

Figure 2:
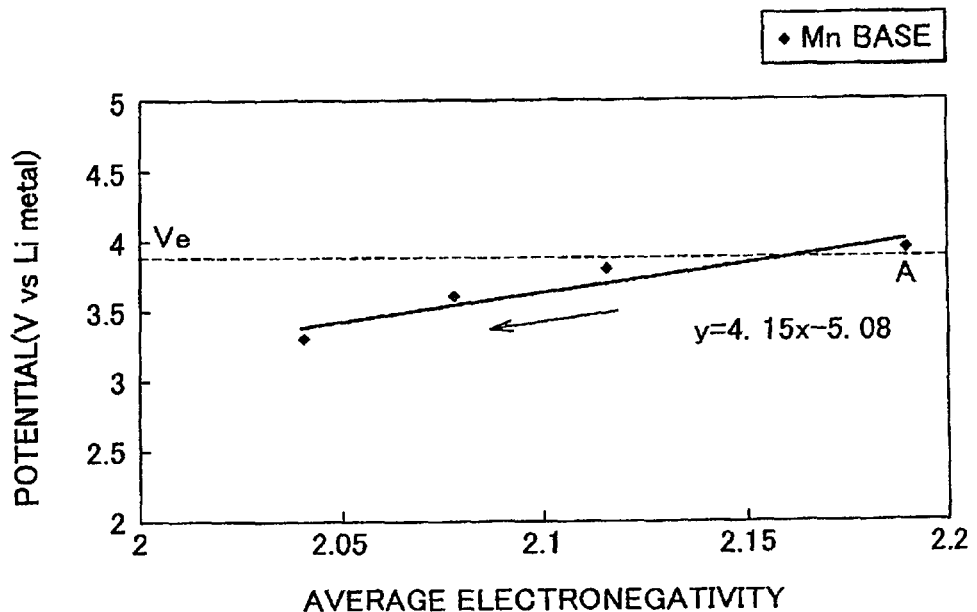
FIG. 2 is a graph (Mn base) that shows the relationship between the average electronegativity of $[P_aM_{1-a}]$ and the redox potential.

In addition, by applying the aspect of the invention, an electrolyte having a composition that contains a nonaqueous solvent having a further low decomposition potential Ve may be used. That is, as shown in FIG. 2, in a battery that is constructed using the non-replaced positive electrode active material A and an electrolyte E2 having a decomposition potential Ve lower than that of the example (electrolyte E1) shown in FIG. 1, when trying to use the battery in a range that takes into consideration the decomposition potential Ve of the electrolyte E2, the capacity further decreases as compared with the battery that uses the electrolyte E1. In contrast, in the present embodiment, by regulating the average electronegativity of $[P_aM_{1-a}]$ in consideration of the decomposition potential Ve of the electrolyte, the redox potential may be decreased to a potential at which the decomposition of the electrolyte does not occur. Specifically, it is only necessary that the average electronegativity of $[P_aM_{1-a}]$ is regulated so as to be lower than (Ve+5.08)/4.15. By so doing, the redox potential decreases to the potential, at which decomposition of the electrolyte does not occur, so the electrolyte having a composition that contains a nonaqueous solvent having a relatively low decomposition potential Ve may be used.

The embodiment of the invention may be a lithium secondary battery that includes an electrolyte having a composition that contains a nonaqueous solvent having a decomposition potential of 5.2 V or below. Desirably, the decomposition potential of the nonaqueous solvent regularly ranges from about 4.5 V to 52 V, and, more desirably, ranges from about 4.5 V to 4.8 V.

The glass former element M is not specifically limited as long as the glass former element M has an electronegativity lower than that of P (phosphorus) and can form glass. For example, in addition to B (boron), Si (silicon) and Sn (tin), a hetero element that has an electronegativity lower than that of P and that can form an oxyacid (typically, an element that can become an essential element X of an oxyacid expressed by XOn) may be employed as the glass former element M. A specific example of the hetero element may be an element, such as Ta (tantalum), Ti (titanium), Nb (niobium), Al (aluminum), V (vanadium), Cr (chromium), Ge (germanium), Mo (molybdenum) and As (arsenic). Among others, at least one of B, Si and Sn is desirably used, and, particularly, B is desirably used. One or two or more of elements may be selected from among the above element group. Desirably, 70 percent (on an atomicity basis) or more of M are formed of one or two or more of elements selected from the group consisting of B, Si and Sn. The substantially whole of M may be formed of one or two or more of elements selected from the group consisting of B, Si and Sn. For example, M may be substantially formed of only B.

Note that, in the specification, the "electronegativity" means Pauling's electronegativity. Specifically, the electronegativity of P (phosphorus) is 2.19, the electronegativity of B (boron) is 2.04, the electronegativity of Si (silicon) is 1.90 and the electronegativity of Sn (tin) is 1.96. In addition, the "average:electronegativity" means the weighted average of electronegativity of each of elements that constitute P and the glass former element M. For example, when the glass former element M is B (boron) and the value of a is 0.75, the average electronegativity of $[P_{0.75}B_{0.25}]$ is $2.19 \times 0.75 + 2.04 \times 0.25 = 2.08$.

Next, a manufacturing method for the positive electrode active material according to the present embodiment will be described. The manufacturing method for the positive electrode active material according to the present embodiment is not specifically limited as long as the above described positive electrode active material may be obtained; and, for example, the positive electrode active material may be synthesized by amorphization through melt extraction. Specifically, stating materials containing elements that constitute a composition formula $Li_xMn[P_MM_{1-M}]_yO_z$ are melted and kneaded, and then rapidly cooled from the melted state to be solidified in a stroke, thus obtaining an amorphous active material. The starting materials normally contain an Li source, an Mn source, a P source and an M source.

The Li source is not specifically limited as long as the Li source contains an Li element; and, for example, the Li source may be LiOH, $Li_2O$, $Li_2CO_3$, or the like. One or two or more of the Li sources may be used.

The Mn source is not specifically limited as long as the Mn source contains an Mn element; and, for example, an oxide, a hydroxide, or the like, that contains an Mn element may be desirably used as the Mn source. Specifically, the Mn source may be MnO, or the like. The P source is not specifically limited as long as the P source contains a P element; and, for example, $P_2O_5$, or the like, may be used as the P source.

The M source is not specifically limited as long as the M source contains the above described glass former element M; and, for example, an oxide, a hydroxide, or the like, that contains the glass former element M may be desirably used. Specifically, when the element M is boron (B), $B_2O_3$, or the like, may be used. When the element M is silicon (Si), $SiO_2$, or the like, may be used. In addition, when the element M is tin (Sn), $SnO_2$, or the like, may be used.

The starting materials (Li source, Mn source, P source and M source) are measured to coincide with a predetermined composition, and are adequately mixed. After that, the mixed material is melted, for example, at 1000° C. to 1200° C., and is then rapidly cooled by a single-roll melt extraction device equipped with a Cu roll. By so doing, an amorphous active material may be obtained. In this way, the positive electrode active material according to the present embodiment may be manufactured.

Figure 3:
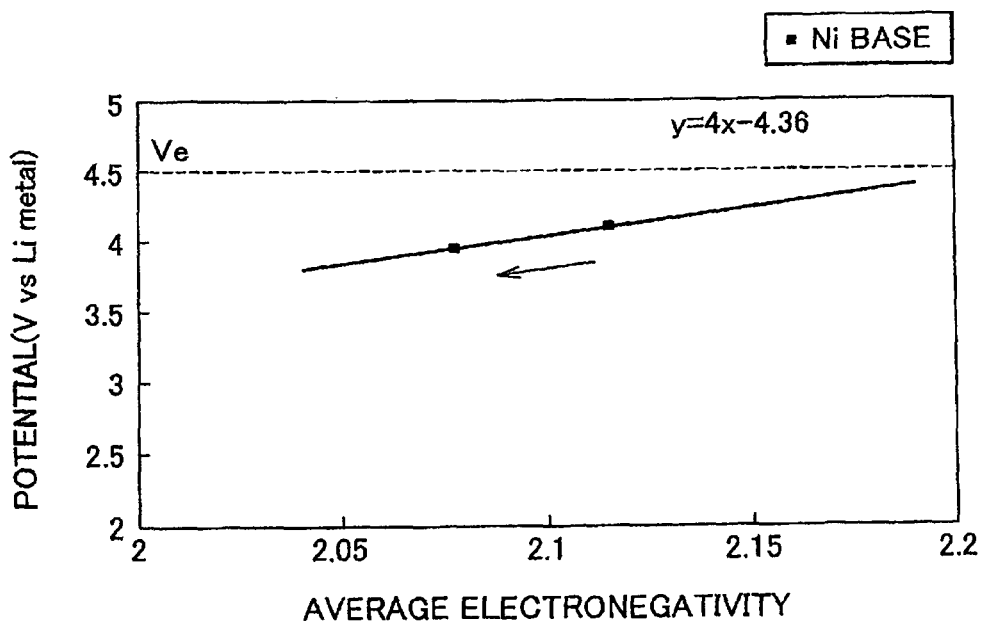
FIG. 3 is a graph (Ni base) that shows the relationship between the average electronegativity of $[P_aM_{1-a}]$ and the redox potential.

Subsequently, a case where A in the composition formula (I) is Ni will be described. FIG. 3 is a graph that shows the relationship between the average electronegativity of $[P_aM_{1-a}]$ and the redox potential in an amorphous positive electrode active material in which A in the composition formula (I) is Ni. As shown in FIG. 3, when the X axis represents the average electronegativity of $[P_aM_{1-a}]$ and the Y axis represents the potential V (vs. Li metal), the average electronegativity of $[P_aM_{1-a}]$ and the redox potential are approximately proportional to each other, and the redox potential decreases as the average electronegativity of $[P_aM_{1-a}]$ decreases. Specifically, the relationship between the average electronegativity of $[P_aM_{1-a}]$ and the redox potential is expressed by Y=4.00X−4.36.

In the case of the Ni base, as well as the Mn base, the average electronegativity of $[P_aM_{1-a}]$ may be appropriately regulated in consideration of the decomposition potential Ve of the electrolyte. Specifically, the redox potential (oxidation potential) is desirably lower at least by about 0.1 V (for example, about 0.1 V to 0.5 V) than the decomposition potential Ve of the electrolyte with respect to lithium, and the value of the average electronegativity of $[P_aM_{1-a}]$ may be regulated so as to fall within the desirable range. In addition, by applying the aspect of the invention, an electrolyte having a composition that contains a nonaqueous solvent having a further low decomposition potential Ve may be used. That is, even when the redox potential is higher than the decomposition potential Ve of the electrolyte, by regulating the average electronegativity of $[P_aM_{1-a}]$ in consideration of the decomposition potential Ve of the electrolyte, the redox potential may be decreased to a potential at which the decomposition of the electrolyte does not occur. Specifically, it is only necessary that the average electronegativity of $[P_aM_{1-a}]$ is regulated so as to be lower than (Ve+4.36)/4.00. By so doing, the redox potential decreases to the potential at which decomposition of the electrolyte does not occur, so the electrolyte having a composition that contains a nonaqueous solvent having a relatively low decomposition potential Ve may be used.

In the technique described here, the concept that "the positive electrode active material is amorphous" includes a mode in which a crystal phase is present in part of the positive electrode active material. The positive electrode active material according to the embodiment of the invention mainly contains an amorphous phase in which A in the composition formula (I) is Ni and contains a crystal phase of at least one of Ni, NiO and $Ni_2P$. Because the positive electrode active material contains the crystal phase, the electron conductivity improves, so a further high capacity may be obtained. In one desirable mode, the positive electrode active material substantially contains only a crystal phase of at least one of Ni, NiO and $Ni_2P$ as the crystal phase. The above crystal phase is, for example, desirably unevenly distributed or precipitated near surfaces of the amorphous $Li_xNi[P_aB_{1-a}]_yO_z$ positive electrode active material particles described here. By so doing, it is possible to further efficiently exhibit the effect of reducing contact resistance between positive electrode active material particles because of the presence of the crystal phase. Alternatively, a crystal phase may be mixed (distributed) in an amorphous phase.

It is only necessary that the mole ratio of the crystal phase with respect to the amorphous phase ranges from about 0.1 mole percent to 10 mole percent, normally ranges from about 0.1 mole percent to 5 mole percent, and, desirably, for example, ranges from about 0.5 mole percent to 1 mole percent. When the percentage of the crystal phase is excessively high, the battery capacity may decrease. When the percentage of the crystal phase is excessively low, it is difficult to sufficiently obtain the effect of improving the electronic conductivity. The mole ratio of the crystal phase with respect to the amorphous phase may be, for example, acquired through surface analysis of the positive electrode active material particles using energy dispersive X-ray fluorescence analysis (EDX).

A method of causing a crystal phase to be present in part of the positive electrode active material particles that mainly contains an amorphous phase is not specifically limited; however, for example, it may be a method of applying mechanical energy to intended positive electrode active material particles (typically, positive electrode active material particles substantially formed of an amorphous phase). By applying mechanical energy, Ni, NiO, or the like, may be crystallized on the surface of the amorphous positive electrode active material particles. Ball milling may be, for example, desirably employed as means for applying mechanical energy. Alternatively, Ni, NiO, or the like, may be crystallized on the surface of amorphous positive electrode active material particles by applying thermal energy.

Note that the disclosure of the specification includes the following matters:

(1) The amorphous positive electrode active material for a lithium secondary battery expressed by the following composition formula: $Li_xA[P_aM_{1-a}]_yO_z$ (I) where, in the formula (I), A is Mn or Ni; M is a glass former element having an electronegativity lower than that of P; and x, y, a and z respectively satisfy 1<x≤2.5, 0<y≤3, 0≤a<1 and z=(x+(valence of A)+(valence of P)×a×y+(valence of M)×(1−a)×y)/2; and (2) The positive electrode active material that is described in the above (1) and in which M in the above composition formula (I) contains an element of at least one of B (boron), Si (silicon), Sn (tin), Ta (tantalum), Ti (titanium), Nb (niobium), Al (aluminum), V (vanadium), Cr (chromium), Ge (germanium), Mo (molybdenum) and As (arsenic).

Although not intended to specifically limit the aspect of the invention, hereinafter, the aspect of the invention will be described in detail by taking a lithium secondary battery (lithium ion battery) in a mode in which an electrode assembly rolled into a flat shape (rolled electrode assembly) and a nonaqueous electrolyte are accommodated in a flat box-shaped (rectangular parallelepiped shape) casing as an example.

Figure 4:
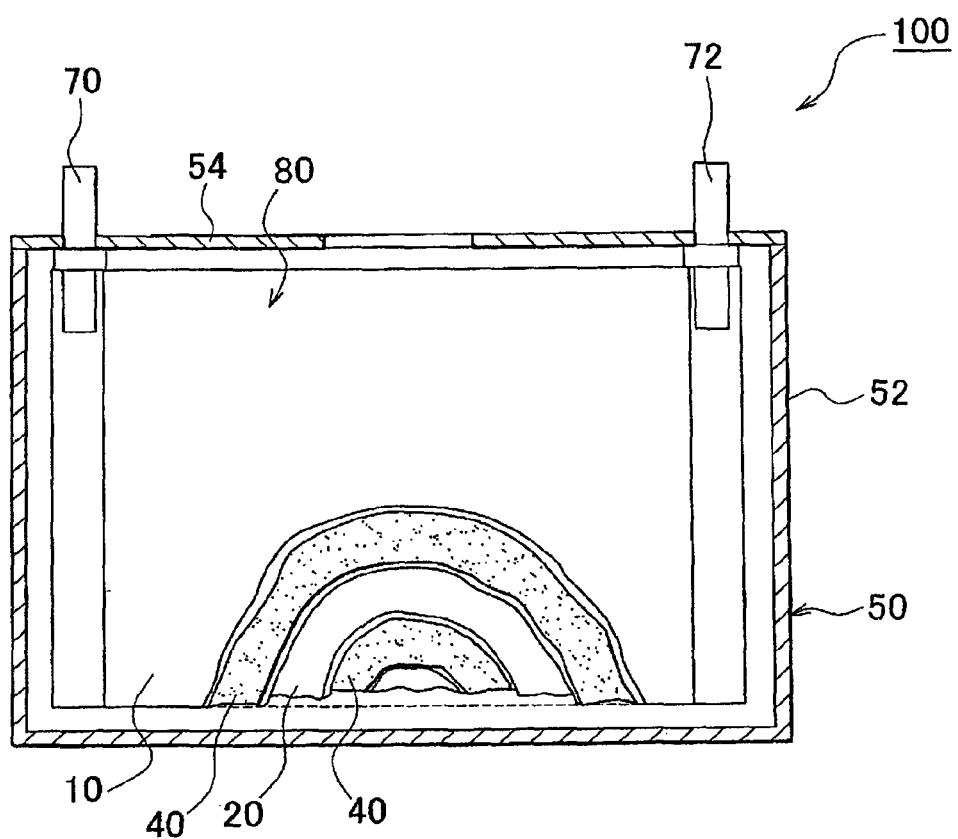
FIG. 4 is a schematic view that shows the configuration of a lithium secondary battery according to an embodiment of the invention.
Figure 5:
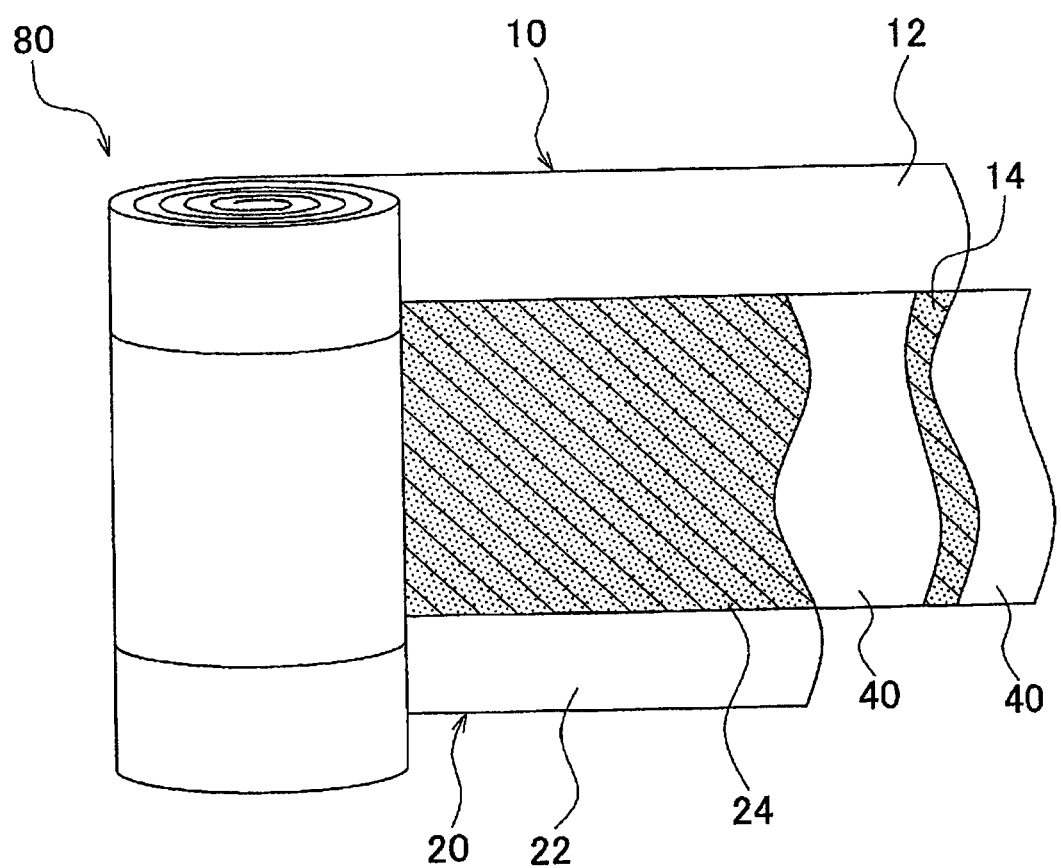
FIG. 5 is a schematic view that shows the configuration of a rolled electrode assembly according to the embodiment of the invention.

FIG. 4 and FIG. 5 show the schematic configuration of the lithium secondary battery according to an embodiment of the invention. The lithium secondary battery 100 has the following configuration. That is, an electrode assembly (rolled electrode assembly) 80 is formed so that a long positive electrode sheet 10 and a long negative electrode sheet 20 are rolled into a flat shape via a long separator 40, and the rolled electrode assembly 80 is accommodated together with a nonaqueous electrolyte (not shown) in a casing 50 having a shape (flat box shape) that can accommodate the rolled electrode assembly 80.

The casing 50 includes a casing body 52 and a lid 54. The casing body 52 has a flat rectangular parallelepiped shape, and the upper end of the casing body 52 is open. The lid 54 closes the opening; The material of the casing 50 is desirably a metal material, such as aluminum and steel (aluminum in the present embodiment). Alternatively, the casing 50 may be formed by molding a resin material, such as PPS and polyimide resin. A positive electrode terminal 70 and a negative electrode terminal 72 are provided at the upper surface (that is, the lid 54) of the casing 50. The positive electrode terminal 70 is electrically connected to a positive electrode of the rolled electrode assembly 80. The negative electrode terminal 72 is electrically connected to a negative electrode 20 of the electrode assembly 80. The flat rolled electrode assembly 80 is accommodated inside the casing 50 together with the nonaqueous electrolyte (not shown).

The rolled electrode assembly 80 according to the present embodiment is similar to the rolled electrode assembly of a normal lithium secondary battery except for the configuration of a positive electrode active material provided for the positive electrode sheet 10, which will be described later.

As shown in FIG. 5, the positive electrode sheet 10 is formed so that a positive electrode mixture layer 14 that contains the above described positive electrode active material as a principal component is applied onto a long positive electrode current collector 12. An aluminum foil or another metal foil suitable for the positive electrode is suitably used as the positive electrode current collector 12. The positive electrode active material used for the positive electrode is as described above.

The positive electrode mixture layer 14 may, where necessary, contain one or two or more of materials that can be used as the constituent components of the positive electrode mixture layer in a general lithium secondary battery. An example of such a material is a conductive material. The conductive material is desirably a carbon material, such as carbon powder and carbon fiber. Alternatively, the conductive material may be conductive metal powder, such as nickel powder. Other than the above, a material that can be used as the component of the positive electrode mixture layer may be various polymer materials that can function as a binder of the constituent material.

The negative electrode sheet 20 may be formed so that a negative electrode mixture layer 24 that contains a negative electrode active material for a lithium secondary battery as a principal component is applied onto a long negative electrode current collector 22. A copper foil or another metal foil suitable for the negative electrode is suitably used as the negative electrode current collector 22. The negative electrode active material may be one or two or more of materials used for a lithium secondary battery in the existing art without particular limitation. A suitable example of the negative electrode active material may be a carbon-based material, such as graphite carbon and amorphous carbon, a lithium-containing transition metal oxide, a transition metal nitride, or the like.

The separator sheet 40 suitably used between the positive and negative electrode sheets 10 and 20 may be formed of a porous polyolefin resin.

The nonaqueous electrolyte accommodated in the casing body 52 together with the rolled electrode assembly 80 may be made of the same material as the nonaqueous electrolyte used for an existing lithium secondary battery without particular limitation. The above nonaqueous electrolyte typically has a composition in which an electrolyte (supporting electrolyte) is contained in an adequate nonaqueous solvent. The nonaqueous solvent may be an aprotic solvent, such as carbonates, esters, ethers, nitriles, sulfones and lactones. For example, the nonaqueous solvent may be one or two or more selected from nonaqueous solvents that are generally known as the ones that can be used for the electrolyte of a lithium ion battery, such as ethylene carbonate (EC), propylene carbonate (PC), diethyl carbonate (DEC), dimethyl carbonate (DMC), ethylmethyl carbonate (EMC), 1,2-dimethoxyethane, 1,2-diethoxyethane, tetrahydrofuran, 2-methyltetrahydrofuran, dioxane, 1,3-dioxolane, diethyleneglycoldimethylether, ethyleneglycoldimethylether, acetonitrile, propionitrile, nitromethane, N,N-dimethylformamide, dimethyl sulfoxide, sulfolane and γ-butyrolactone.

In addition, the electrolyte (supporting electrolyte) may be one or two or more selected from various lithium salts that are known as the ones that can function as a supporting electrolyte in the electrolyte of a lithium secondary battery, such as $LiPF_6$, $LiBF_4$, $LiN(SO_2CF_3)_2$, $LiN(SO_2C_2F_5)_2$, $LiCF_3SO_3$, $LiC_4F_9SO_3$, $LiC(SO_2CF_3)_3$ and $LiClO_4$. The concentration of the supporting electrolyte (supporting electrolyte) is not specifically limited; for example, the concentration may be the same as that of the electrolyte used in an existing lithium secondary battery. The concentration of the electrolyte in the nonaqueous electrolyte, for example, ranges from about 0.05 mol/L to 10 mol/L, and desirably ranges from about 0.1 mol/L to 5 mol/L, and is normally set to about 1 mol/L.

The nonaqueous electrolyte is accommodated in the casing body 52 together with the rolled electrode assembly 80, and the opening of the casing body 52 is sealed by, for example, the lid 54 welded thereto. By so doing, construction (assembly) of the lithium secondary battery 100 according to the present embodiment is completed. Note that a sealing process for the casing body 52 and an arrangement (immersion) process for the electrolyte may be the same as those in manufacturing an existing lithium secondary battery. After that, conditioning (initial charging and discharging) of the battery is carried out. Processes for degassing, quality inspection, and the like, may be carried out where necessary.

The thus obtained lithium secondary battery is constructed using the positive electrode that contains the positive electrode active material described here, so the lithium secondary battery can exhibit further high battery characteristics (for example, high capacity).

Hereinafter, first to sixth examples related to the aspect of the invention will be described; however, it is not intended to limit the aspect of the invention to the specific examples. Note that, in the following first to sixth examples, B (boron) was used as the element M that replaces P.

<Synthesis of Mn-Based Positive Electrode Active Material>

In the first to third examples and a first comparative example, a positive electrode active material made of an amorphous $Li_xMn[P_aB_{1-a}]_yO_z$ was synthesized so that Li:Mn:P:B becomes the composition ratio shown in the following Table 1. Specifically, LiOH as an Li source, MnO as an Mn source, $P_2O_5$ as a P source and $B_2O_3$ as a B source were measured so that the constituent components of these materials coincide with a predetermined mole ratio, and these materials were mixed to obtain a raw material mixture. Subsequently, the raw material mixture was melted at 1000° C. to 1200° C. in an atmosphere of Ar, and then rapidly cooled by a single-roll melt extraction device to thereby synthesize a positive electrode active material made of amorphous $Li_xMn[P_aB_{1-a}]_yO_z$. The obtained amorphous $Li_xMn[P_aB_{1-a}]_yO_z$ was milled by a predetermined milling device to prepare a powdery amorphous Mn-based positive electrode active material.

TABLE 1

| | Li:Mn:P:B |
|---|---|
| First Example | 2:1:1:1 |
| Second Example | 2:1:0.5:1.5 |
| Third Example | 2:1:0:2 |
| First Comparative Example | 2:1:2:0 |

<Ball Milling>

The obtained amorphous $Li_xMn[P_aB_{1-a}]_yO_z$ powder was subjected to ball milling with a general ball mill device at a rotational speed of 300 rpm for 3 hours. Furthermore, acetylene black as the conductive material was measured so that the mass ratio of the positive electrode active material and the acetylene black becomes 70:25, and the positive electrode active material and the acetylene black were mixed. Then, the obtained mixture was further subjected to ball milling at a rotational speed of 300 rpm for 3 hours. In this way, the positive electrode active material powder made of the amorphous $Li_xMn[P_aB_{1-a}]_yO_z$ having a mean diameter of 3 μm was obtained as a mixture with the conductive material.

The crystallinity of the thus obtained positive electrode active material powder made of each of $Li_xMn[P_aB_{1-a}]_yO_z$ according to the first to third examples and the first comparative example was examined by X-ray diffraction spectroscopy; however, no peak that proves that the crystallinity is crystalline was observed, and it was determined that the crystallinity of each positive electrode active material powder is amorphous (amorphous structure).

<Synthesis of Ni-Based Positive Electrode Active Material>

In the fourth and fifth examples and a second comparative example, a positive electrode active material made of an amorphous $Li_xNi[P_aB_{1-a}]_yO_z$ was synthesized so that Li:Ni:P:B becomes the composition ratio shown in the following Table 2. Specifically, LiOH as an IA source, NiO as an Ni source, $P_2O_5$ as a P source and $B_2O_3$ as a B source were measured so that the constituent components of these materials coincide with a predetermined mole ratio, and these materials were mixed to obtain a raw material mixture. Subsequently, the raw material mixture was melted at 1000° C. to 1200° C. in an atmosphere of Ar, and then rapidly cooled by a single-roll melt extraction device to thereby synthesize a positive electrode active material made of amorphous $Li_xNi[P_aB_{1-a}]_yO_z$. The obtained amorphous $Li_xNi[P_aB_{1-a}]_yO_z$ was milled by a predetermined milling device to prepare a powdery amorphous Ni-based positive electrode active material.

TABLE 2

|  | Li:Ni:P:B |
| --- | --- |
| Fourth Example | 2:1:1:1 |
| Fifth Example | 2:1:0.5:1.5 |
| Second Comparative Example | 2:1:2:0 |

<Ball Milling>

The obtained amorphous $Li_xNi[P_aB_{1-a}]_yO_z$ powder was subjected to ball milling with a general ball mill device at a rotational speed of 300 rpm for 3 hours. Furthermore, acetylene black as the conductive material was measured so that the mass ratio of the positive electrode active material and the acetylene black becomes 70:25, and the positive electrode active material and the acetylene black were mixed. Then, the obtained mixture was further subjected to ball milling at a rotational speed of 300 rpm for 3 hours. In this way, the positive electrode active material powder made of the amorphous $Li_xNi[P_aB_{1-a}]_yO_z$ having a mean diameter of 3 μm was obtained as a mixture with the conductive material.

The crystallinity of the thus obtained positive electrode active material powder made of each of $Li_xNi[P_aB_{1-a}]_yO_z$ according to the fourth and fifth examples and the second comparative example was examined by X-ray diffraction spectroscopy; however, almost no peak that proves that the crystallinity is crystalline was observed, and it was determined that an amorphous phase (amorphous structure) occupies a great part of the positive electrode active material powder. In addition, when these types of positive electrode active material powder were subjected to surface analysis by transmission electron microscope (TEM) and electron diffraction, in each of them, slight amounts of Ni crystal phases were observed on the surface portion of the amorphous positive electrode active material powder (mixed in the amorphous phase).

<Preparation of Lithium Secondary Battery>

Subsequently, the positive electrode active material powder made of each of $Li_xNi[P_aB_{1-a}]_yO_z$ obtained in the first to third examples and the first comparative example and the positive electrode active material powder made of each of $Li_xNi[P_aB_{1-a}]_yO_z$ obtained in the fourth and fifth examples and the second comparative example were used to prepare a corresponding one of lithium secondary batteries, and then the charge and discharge characteristics of each of the lithium secondary batteries were evaluated. Specifically, first, polyvinylidene difluoride (PVdF) as a binder and a mixture of the obtained positive electrode active material powder and acetylene black (conductive material) (the mixture contains the positive electrode active material and the acetylene black at a mass ratio of 70:25) were measured so that the mass ratio of the positive electrode active material, the acetylene black and PVdF becomes 70:25:5 and then mixed in an N-methylpyrrolidone (NMP) to prepare a pasty positive electrode mixture layer composition. The pasty positive electrode mixture layer composition was applied onto one side of an aluminum foil (positive electrode current collector) in a layer and was dried. By so doing, a positive electrode sheet in which the positive electrode mixture layer was provided on one side of the positive electrode current collector was obtained.

Figure 6:
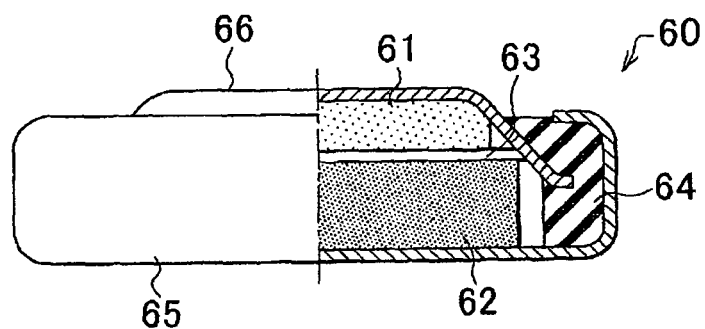
FIG. 6 is a schematic view that shows the configuration of each of test coin cells according to examples and comparative examples.

The positive electrode sheet was stamped into a circular shape having a diameter of 16 mm to prepare a pellet positive electrode (having a mass of 0.143 g). The positive electrode (working electrode), a metal lithium (a metal Li foil having a diameter of 19 mm and a thickness of 0.02 mm was used) as a negative electrode (counter electrode) and a separator (a porous sheet having a diameter of 22 mm and a thickness of 0.02 mm with a three-layer structure (a porous sheet formed of polyethylene (PE)/polypropylene (PP)/polyethylene (PE) was used) were assembled into a stainless casing together with a nonaqueous electrolyte to construct a coin cell 60 (half cell for evaluating charge and discharge performance) having a diameter of 20 mm and a thickness of 3.2 mm (2032 type) shown in FIG. 6. FIG. 6 shows a positive electrode (working electrode) 61, a negative electrode (counter electrode) 62, a separator 63 impregnated with an electrolyte solution, a gasket 64, a casing (negative electrode terminal) 65 and a lid (positive electrode terminal) 66. Note that $LiPF_6$ as a supporting electrolyte was contained at a concentration of about 1 mol/L in a mixed solvent that includes propylene carbonate (PC), ethylene carbonate (EC) and dimethyl carbonate (DMC) at a volume ratio of 1:1:3 and the resultant mixture was used as a nonaqueous electrolyte. In this way, the lithium secondary battery (test cell) 60 was assembled. After that, initial charge and discharge process (conditioning) was carried out in an ordinary method to obtain a test cell.

<Charge and Discharge Characteristics Test>

The test cells constructed using the respective types of obtained positive electrode active material powder according to the first to fifth examples and the first and second comparative examples were subjected to charge and discharge characteristics test. Specifically, the test cells constructed using the respective types of Mn-based positive electrode active material powder according to the first to third examples and the first comparative example were charged and discharged under the following conditions (1) and (2) in an environment of about 25° C. In addition, the test cells constructed using the respective types of Ni-based positive electrode active material powder were changed and discharged in the same conditions as those of (1) and (2) in an environment of about 25° C.; however, the test cells were charged and discharged in a situation that the cut potential at the time of charging was changed to 4.7 V (vs. Li/Li⁺) and the cut potential at the time Of discharging was changed to 2.0 V (vs. Li/Li⁺).

(1) Charging was carried out at a constant current of 0.1 mA/cm² until the potential of the positive electrode becomes 5.0 V (vs. Li/Li⁺), and then stopped for 10 minutes. (2) Discharging was carried out at a constant current of 0.1 mA/cm² until the potential of the positive electrode becomes 1.5 V (vs. Li/Li⁺), and then stopped for 10 minutes.

Figure 7:
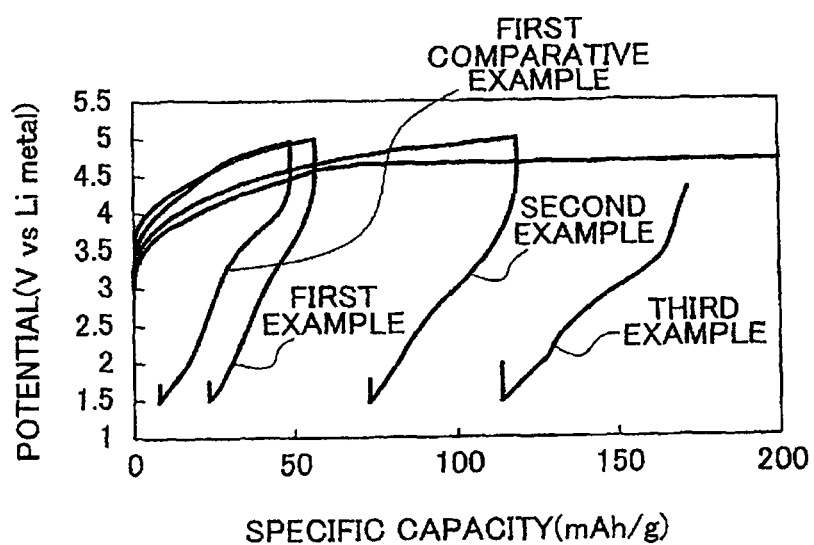
FIG. 7 is a graph that shows the charge and discharge characteristics of the test cells according to first to third examples and a first comparative example.

FIG. 7 shows the results of charge and discharge characteristics test conducted on the test cells constructed using the respective types of Mn-based positive electrode active material powder according to the first to third examples and the first comparative example. As is apparent from FIG. 7, the test cells of which P is replaced by B according to the first to third examples were able to extract larger amounts of lithium from the respective positive electrode active materials in the above charging condition (until the potential of the positive electrode becomes 5.0 V) as compared with the non-replaced test cell according to the first comparative example. Therefore, it was confirmed that, by replacing P by B, the capacity may be further increased in charging and discharging within a predetermined potential range (in which decomposition of the electrolyte does not excessively proceed). In addition, through comparison among the first to third examples, it was found that, as the percentage at which P is replaced by B increases, the capacity may be further increased. FIG. 1 is a graph for which the obtained charge and discharge characteristics curve was converted into a differential capacity and then the relationship between the observed redox potential and the average electronegativity of $[P_aM_{1-a}]$ was plotted. As shown in FIG. 1, it was confirmed that the average electronegativity of $[P_aM_{1-a}]$ and the redox potential are approximately proportional to each other, and the redox potential decreases as the average electronegativity of $[P_aM_{1-a}]$ decreases.

Figure 8:
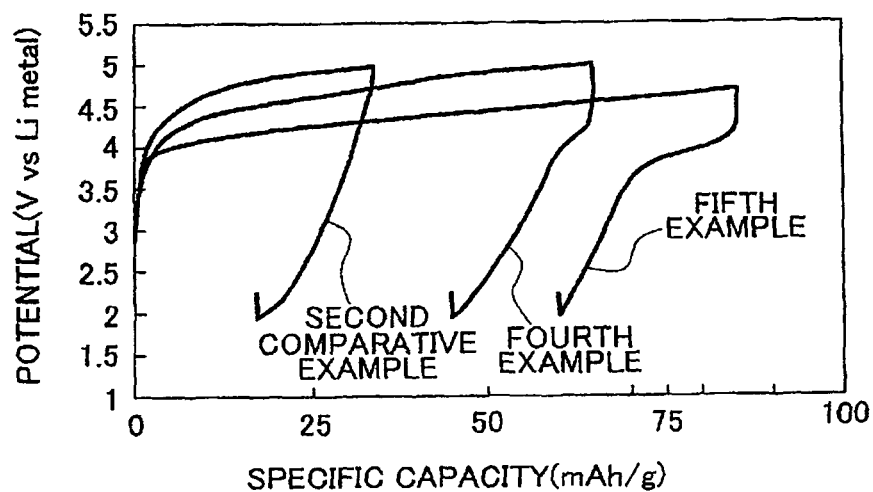
FIG. 8 is a graph that shows the charge and discharge characteristics of the test cells according to fourth and fifth examples and a second comparative example.

In addition, FIG. 8 shows the results of charge and discharge characteristics test conducted on the test cells constructed using the respective types of Ni-based positive electrode active material powder according to the fourth and fifth examples and the second comparative example. As shown in FIG. 8, the Ni-based positive electrode active material powder has the same charge and discharge characteristics as those of the Mn-based positive electrode active material powder. That is, the test cells of which P is replaced by B according to the fourth and fifth examples were able to extract larger amounts of lithium from the respective positive electrode active materials as compared with the non-replaced test cell according to the second comparative example. Therefore, it was confirmed that, by replacing P by B, the capacity may be further increased in charging and discharging within a predetermined potential range (in which decomposition of the electrolyte does not excessively proceed). In addition, through comparison between the fourth and fifth examples, it was found that, as the percentage at which P is replaced by B increases, the capacity may be further increased. FIG. 3 is a graph for which the obtained charge and discharge characteristics curve was converted into a differential capacity and then the relationship between the observed redox potential and the average electronegativity of $[P_aM_{1-a}]$ was plotted. As shown in FIG. 3, it was confirmed that the average electronegativity of $[P_aM_{1-a}]$ and the redox potential are approximately proportional to each other, and the redox potential decreases as the average electronegativity of $[P_aM_{1-a}]$ decreases.

In addition, in the lithium secondary battery constructed using the amorphous Ni-based positive electrode active material powder, an Ni crystal phase was mixed in the amorphous phase of the positive electrode active material, and then the following experiment was conducted in order to ensure that the capacity may be further increased.

That is, in the sixth example, $Li_xNi[P_aB_{1-a}]_yO_z$ positive electrode active material was synthesized so as to become the same composition ratio (Li:Ni:P:B=2:1:0.5:1.5) as that of the fifth example; however, ball milling was carried out for a period of time longer than that of the fifth example. Specifically, the $Li_xNi[P_aB_{1-a}]_yO_z$ positive electrode active material powder obtained through synthesis of the Ni-based positive electrode active material was subjected to ball milling using a general ball mill device at a rotational speed of 300 rpm for 48 hours. Furthermore, acetylene black as the conductive material was measured so that the mass ratio of the positive electrode active material and the acetylene black becomes 70:25, and the positive electrode active material and the acetylene black were mixed. Then, the obtained mixture was further subjected to ball milling at a rotational speed of 300 rpm for 24 hours. In this way, the positive electrode active Material powder made of the amorphous $Li_xNi[P_aB_{1-a}]_yO_z$ having a mean diameter of 3 μm was obtained as a mixture with the conductive material.

Figure 9:
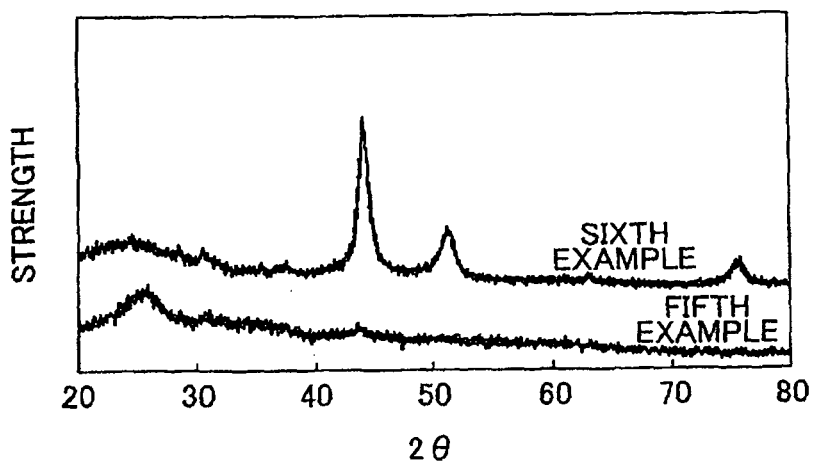
FIG. 9 is a graph that shows the X-ray diffraction patterns in fifth and sixth examples.

The crystallinity of each of the types of positive electrode active material powder according to the fifth and sixth examples was examined by X-ray diffraction spectroscopy; however, as shown in FIG. 9, almost no peak that proves that the crystallinity is crystalline was observed in the fifth example, and broad diffuse scattering unique to the amorphous phase occupied a great part of the positive electrode active material powder. In contrast, in the sixth example in which a ball milling period of time is extended as compared with the fifth example, not only broad diffuse scattering unique to the amorphous phase but also a peak that indicates an Ni crystal phase (for example, a peak around 2θ=43°) was observed clearly. In addition, when the obtained positive electrode active material powder was subjected to surface analysis by transmission electron microscope (TEM) and electron diffraction, larger amounts of Ni crystal phases were observed on the surface of the amorphous positive electrode active material in the sixth example as compared with the fifth example.

A lithium secondary battery (test cell) was constructed using the positive electrode active material powder according to the sixth example. The lithium secondary battery (test cell) was constructed similarly to the test cell according to the above described fifth example. In addition, the test cells according to the fifth and sixth examples each were subjected to charge and discharge characteristics test. The charge and discharge characteristics test condition is the same as that of the above described test condition except that the test temperature was changed to 60° C. The results were shown in FIG. 10.

Figure 10:
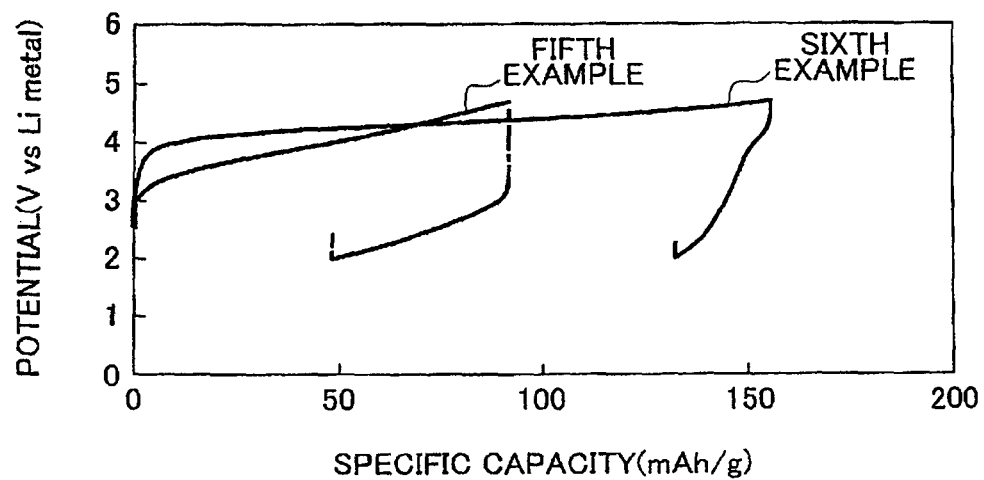
FIG. 10 is a graph that shows the charge and discharge characteristics of the test cells according to the fifth and sixth examples.

As is apparent from FIG. 10, the test cell according to the sixth example in which larger amounts of Ni crystal phases are present in the amorphous phase of the positive electrode active material was able to extract larger amounts of lithium from the positive electrode active material as compared with the test cell according to the fifth example. Therefore, it was confirmed that, in the amorphous positive electrode active material made of $Li_xNi[P_aB_{1-a}]_yO_z$, Ni crystal phases are mixed in the amorphous phase to thereby make it possible to further increase the capacity in charging and discharging in a predetermined potential range (in which decomposition of the electrolyte does not excessively proceed).

The aspect of the invention is described using the embodiment; however, the above description is not intended to limit the scope of the invention, and, of course, various alterations are possible.

Figure 11:
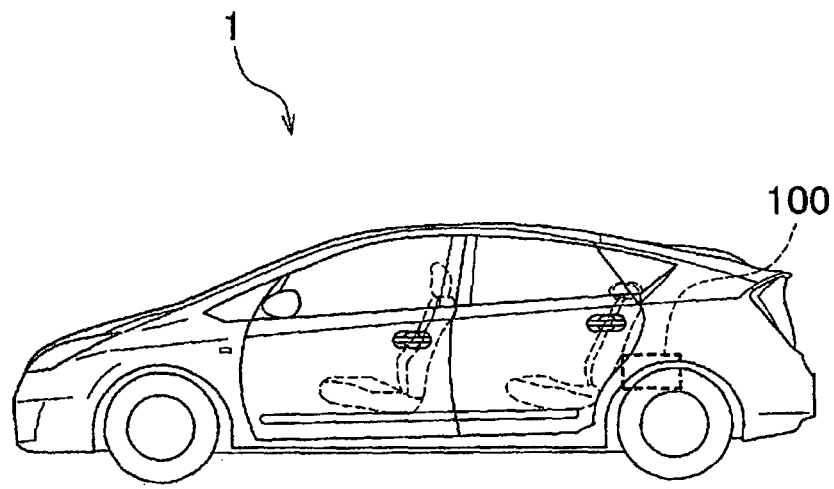
FIG. 11 is a side schematic view that shows a vehicle equipped with the lithium secondary battery according to the embodiment of the invention.

A lithium secondary battery according to the aspect of the invention suppresses a decrease in load characteristics during initial charging as described above and exhibits further high battery performance, so the lithium secondary battery may be particularly suitably used as a power supply for a motor (electric motor) mounted on a vehicle, such as an automobile. Thus, as schematically shown in FIG. 11, the aspect of the invention provides a vehicle 1 (typically, an automobile; particularly, an automobile equipped with an electric motor, such as a hybrid automobile, an electric automobile and a fuel cell automobile) that includes the lithium secondary battery 100 (typically, a battery pack in which a plurality of lithium secondary batteries are serially connected) as a power supply.

The invention claimed is:

1. A lithium secondary battery comprising:
   a positive electrode that contains a positive electrode active material;
   a negative electrode; and
   a nonaqueous electrolyte, wherein
   the positive electrode active material mainly contains a Ni amorphous phase and further contains a crystal phase of at least one of Ni, NiO and Ni$_2$P, wherein the Ni amorphous phase of the positive electrode active material is expressed by the following composition formula:

$$Li_xNi[P_aB_{1-a}]_yO_z \qquad (I)$$

where, in the composition formula (I), x, y, a and z respectively satisfy $1<x\leq2.5$, $0<y\leq3$, $0\leq a<1$ and z=(x+(valence of Ni)+(valence of P)ay+(valence of B)(1−a)y)/2, wherein the molar ratio of the crystal phase with respect to the amorphous phase ranges from about 0.1 mole percent to 10 mole percent.

2. A vehicle equipped with the lithium secondary battery according to claim 1.

3. The lithium secondary battery according to claim 1, wherein the molar ratio of the crystal phase with respect to the amorphous phase ranges from about 0.1 mole percent to 5 mole percent.

4. The lithium secondary battery according to claim 1, wherein the molar ratio of the crystal phase with respect to the amorphous phase ranges from about 0.5 mole percent to 1 mole percent.

* * * * *